March 31, 1953  N. R. BUNNELL  2,633,027
METHOD OF TESTING FLOW CHARACTERISTICS
OF GRANULAR MATERIALS
Filed July 19, 1951
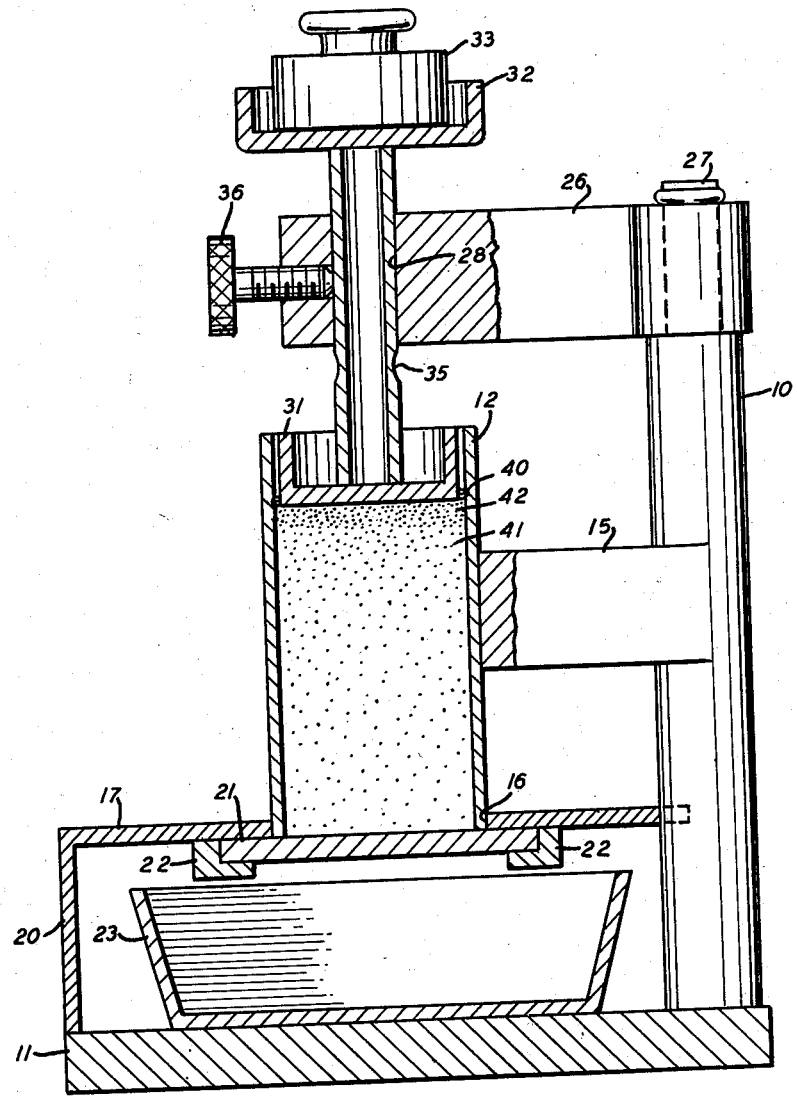
INVENTOR
N. R. BUNNELL
BY [signature]
ATTORNEY Patented Mar. 31, 1953

2,633,027

UNITED STATES PATENT OFFICE 2,633,027

METHOD OF TESTING FLOW CHARACTERISTICS OF GRANULAR MATERIALS

Norman Robertson Bunnell, Joppa, Md., assignor to Western Electric Company, Incorporated, New York, N. Y., a corporation of New York Application July 19, 1951, Serial No. 237,517

1 Claim. (Cl. 73—432)

This invention relates to a method of testing flow characteristics of granular materials, and more particularly to a method of determining the pressure at which granular materials will pack into a solid mass between the walls of a container.

In many manufacturing processes it is necessary to convey granular material from a supply hopper to various types of blending apparatus. Conveyors used for this purpose, whether they are the endless belt type or the spiral screw type, are fully enclosed in suitable ducts or housings. It is a well known fact that certain types of granular materials have a tendency to pack into a solid mass and bridge across the walls of the conveyor housing when the pressure applied to the material by the conveyor exceeds a predetermined value.

Usually a conveyor is designed to handle a particular material for a particular process, but often it is not known at what pressure the material to be conveyed thereby will pack into a solid mass. As a result, the conveyor may be well designed according to conveyor practice and yet the material to be conveyed may pack into a solid mass and cause the conveyor system to operate unsatisfactorily. Heretofore no apparatus has been developed to determine the packing pressure of powdered or granular materials in closed conveyor systems in order that a conveyor may be designed to apply pressure on a given material less than that required to pack the material into a solid mass.

An object of the invention is to provide a new and improved method of testing the flow characteristics of granular materials.

Another object of the invention is to provide a new and improved method of determining the pressure at which granular materials will pack into a solid mass between the walls of a container.

A method of determining the pressure at which a granular material packs into a solid mass between the walls of a hollow container in accordance with certain features of the invention comprises placing a predetermined amount of a granular material in a tubular member, applying a predetermined pressure on the material to pack it tightly in the member, removing the pressure from the material to determine whether any portion of the material is packed into a solid mass and bridged across the walls of the member, and repeating the above-outlined steps with incremental increases in the pressure applied to the material until a portion of the material is packed sufficiently to cause it to bridge across the walls of the member.

An apparatus which may be used to determine the pressure at which a granular material packs into a solid mass between the walls of a container in accordance with certain features of the invention may include a support, means for holding a predetermined amount of a granular material to be tested on the support, and means for applying a predetermined pressure to the material in a direction to pack it in the holding means, whereby when the holding means is separated from the support it may be determined whether the material is packed sufficiently to cause a portion of the material to bridge across the walls of the holding means and remain therein after said holding means and support are separated.

A clear understanding of the invention may be had from the following detailed description of a specific embodiment thereof, when read in conjunction with the appended drawing in which the single figure is a front elevation of an apparatus for determining the packing point of granular material, having portions thereof broken away to illustrate the construction of the apparatus.

Referring now to the drawing, a post 10 is secured in an upright position on a base 11, and a tubular member 12, designed to receive a sample of granular material to be tested, is secured in a vertical position to a support 15 secured rigidly to the post 10. The lower end of tubular member 12 fits neatly in a bore 16 provided in a plate 17 having one end thereof secured rigidly to the post 10 and the other end thereof turned downwardly and secured to the left hand side of the base 11. The plate 17 is positioned parallel to and a substantial distance above the base 11 as shown on the drawing. It is to be understood that the base 11 may be made square and of sufficient size to support the apparatus, and that the plate 17 need not be as wide as the base 11, it being sufficient that the plate be wide enough to receive the bore 16.

A cover 21 is mounted slidably in parallel guides 22—22 secured to the under side of the plate 17. The plate 21 may be positioned in the guides so that it completely closes the bottom of the tubular member 12, or it may be withdrawn from the guides so as to open the bottom of the tubular member into the space formed between the plate 17 and the base 11. A pan 23 is positioned slidably on the base 11 and is provided with a suitable handle (not shown) by means of which the pan may be readily positioned on the base or removed from the base. An arm 26 is mounted pivotally on an upper end 27 of the post 10 which has been reduced substantially in diameter with respect to the diameter of the post 10 to fit into a bore provided in the end of the arm 26 in the manner shown on the drawing. The opposite end of the arm 26 is provided with a bore 28 designed to receive slidably a tubular rod 30 having a cup shaped ram 31 secured on the lower end thereof and designed to fit loosely in the tubular member 12. A cup shaped support 32 is secured on the opposite end of the rod 30 for receiving a weight 33. The rod 30 is designed to fit loosely in the bore 28, so that the weight 33 urges the ram 31 downwardly into the tubular member 12 with a force depending on the mass of the weight 33.

The rod 30 is provided with an annular groove 35 designed to receive the end of a thumb screw 36 mounted threadedly in the end of the arm 26. The groove 35 is located in the rod 30 so that when the ram 31 is moved upwardly until it engages the under side of the arm 26, the groove is aligned with the end of the screw 36, and a few turns of the screw in the proper direction locks the ram 31 in its uppermost position. The clearance between the arm 26 and the top of the tubular member 12 is such that when the ram 31 is locked in its uppermost position, the ram is positioned above the top of the tubular member so that the arm 26 may be moved pivotally on the end 27 of the post 10. The inner wall of the tubular member 12 should have a substantially smooth surface and a groove 40 cut in the wall near the upper end thereof to be used as a guide in determining how much granular material, indicated at 41, is to be placed in the tubular member 12.

When a predetermined amount of a granular material 41 is placed in the member 12, and subjected to the downward pressure of the weighted ram 31, the material adjacent to the ram is packed more tightly together than the material in the lower portion of the member 12. A weight 33 may be selected which will exert sufficient pressure to pack the material 41 into a solid layer 42 under the ram 31, which remains intact in the member 12 when the cover 21 is removed. The pressure, in pounds per square inch, at which the material 41 will pack into a layer 42 of sufficient thickness to bridge across the walls of the member 12 and remain in such condition after the cover is removed will be referred to hereinafter as the "packing point" of the material.

Operation

In using the above-described apparatus, the ram 31 is moved to its uppermost position, and the thumb screw is threaded into the groove 35 to hold the ram in this position. The arm 26 then is turned on the end 27 of the post 10, so that the ram 31 is misaligned with the tubular member 12. Assuming that the cover 21 is positioned in the guides 22 so that it completely closes the bottom of the tubular member 12, a quantity of granular material 41 is poured in the top of the tubular member until the tubular member is filled to the groove 40. The arm 26 then is moved to position the ram 31 directly over the tubular member 12, and the thumb screw 36 is turned so that the rod 30 can slide freely in the bore 28. The ram then is lowered gently into the end of the tubular member 12 until it rests on the top of the granular material 41.

A weight 33, having a known predetermined mass, then is positioned in the support 32, and as a result, the mass of the weight 33 and ram 31 forces the ram downwardly into the member 12 and packs the powdered material in the tube. As soon as the downward movement of the ram 31 ceases, the weight 33 is removed from the support 32 and the ram 31 then is raised to its uppermost position and locked therein by the screw 36. The arm 26 is moved to one side of the tubular member 12, so that the upper end of the tubular member 12 is not obstructed thereby.

The plate 21 then is withdrawn from the guides 22 and thereby opens the end of the tubular member 12 so that it communicates with the space between the plate 17 and the base 11. When the cover is removed, the material 41 now is unsupported and free to flow from the tubular member 12 directly into the pan 23. If the weight 33 was not of sufficient mass to pack the material 41 tightly in the tubular member into a layer at 42, all of the material 41 will flow from the tubular member into the pan 23. This condition indicates that the pressure applied to the material by the weight 33 was not sufficient to pack the material into a solid mass and cause it to bridge across the walls of the tubular member 12.

The assembly of the rod 30, the ram 31, and the support is designed to have a predetermined mass which is much less than the mass of the weights to be positioned on the support 32. As a result, the combined mass of the ram assembly and a selected weight 33 exerts a known pressure on the material 41 in the tubular member 12. The internal diameter of the tubular member is arranged so that the total pressure applied to the material 41 may be expressed readily in terms of pounds per square inch. Therefore, when the first weight 33 is placed on the support 32, the resulting pressure on the material 41 is noted in pounds per square inch in order to determine whether a weight 33 having a greater or lesser mass is required to determine the packing point of the material 41.

Assuming that all of the material 41 fell out of the tubular member when the cover 21 was removed, the cover 21 is replaced in the guides 22 and the material 41 is poured from the pan 23 into the tubular member until the level of the material coincides with the groove 40. The arm 26 then is moved to align the ram 31 with the tubular member, the ram is lowered into the tubular member until it rests on the material 41, and another weight having a predetermined increased mass is positioned on the support 32. This weight forces the ram 31 further into the tubular member 12 and packs the material more tightly in the tubular member. Assuming that the pan 23 has been replaced on the base 11, the weight 33 is removed from the support 32 and the ram is withdrawn from the end of the tube, so that the arm 26 may be turned about the end 27 of the post 10. The cover plate 21 then is removed from the guides.

If all of the powdered material 41 again falls from the tubular member into the pan 23, the above-described testing procedure is repeated, using successive weights having a predetermined increase in mass for each testing operation, and the results are recorded. Ultimately, a weight applied to the ram will pack the material 41 in the tube to such an extent that when the cover plate 21 is removed, some of the material 41 falls into the pan, but a layer of the material at 42 is packed into a solid mass and bridges across the walls of the tube with sufficient force to support itself in the member after the cover plate 21 has been removed. When this condition is observed in the tube 12, the mass of the weight 33 that produced the condition is noted and the packing point of the material may be tabulated in terms of pounds per square inch.

It is to be understood that if the first weight 33 positioned on the ram 31 causes the upper portion of the material to pack into a solid mass in the tubular member and bridge across the walls of the tubular member, it may be desirable to apply a weight 33 having less mass than the first weight used, in order to accurately determine the packing point of the material.

The above-described device is particularly useful in instances where a conveyor system has been installed to convey a particular granular material, which may be purchased from several sources of supply. For example, carbon black pigment, which is used in compounding rubber compositions and synthetic elastomeric compounds, may be purchased from several sources of supply and in many instances the particular size of the pigment may vary from supply source to supply source. As a result, it may be found that a carbon black pigment obtained from one source will pass through the conveyor system satisfactorily, while a carbon black pigment from another supply source will pack in the conveyor system into a solid mass and prevent the conveyor from operating satisfactorily. In order to prevent this condition from occurring, the packing point of the carbon black pigment obtained from each supply source may be determined by means of the above-described device. These packing points may be compared with each other, and assuming that it is known that one of the carbon black pigments will not pass through the conveyor system without packing, it follows that all the pigments having a packing point greater than that of the unsatisfactory pigment will pass through the conveyor system satisfactorily. In this way, it may readily be determined before a pigment is placed in a conveyor system, whether or not it will pack into a solid mass and bridge across the walls of the conveyor housing.

This feature of the invention is clearly illustrated by the following summation of actual tests made on various types of carbon black pigments. The tubular member 12 was made from 2" steel pipe, having an inside diameter of approximately 2.07". At least forty samples of pigments from various sources of supply were tested in the above-described device, and it was found that the packing point of the pigments ranged from 12 pounds per square inch to 200 pounds per square inch. It was determined that pigments having a packing point of less than 40 pounds per square inch would not pass through a particular conveyor system provided for conveying the pigments from a supply hopper to a plurality of compound mixing machines. By determining the packing point of a sample of each new supply of pigment, no pigments having a packing point less than 40 pounds per square inch would be accepted. In this manner the shutdown time of the conveyor apparatus due to packing of the material therein is eliminated.

The above-described device is very useful in coordinating the conveyor design with the packing point of a particular granular material, and after the packing point is determined in the above-described device, the conveyor may be designed so that no portion thereof will apply a pressure to the material in excess of the packing point determined with the device.

It is to be understood that the tubular member 12 may be made of copper tubing, brass tubing, steel tubing, or other suitable metals, as long as a smooth internal wall can be provided in the tube. The tubular member 12 also can be made of glass or transparent tubing made from a synthetic resin, such as, methyl methacrylate. It may be desirable to make the tubular member 12 transparent in order that the thickness of the layer of material that bridges across the walls of the tubular member may be observed. As a result, each sample of material could be packed in the tubular member to the same extent, and an accurate comparison of the materials may be obtained for purposes of comparing the packing points of materials in connection with the ability of the materials to be conveyed through a conveyor system.

It is to be understood that the above-described device may be readily modified or altered to suit various types of powdered materials and to provide means for reading directly the packing point of the powdered or granular materials in any suitable terms without departing from the spirit and scope of the invention.

What is claimed is:

The method of determining the point at which a granular material bridges across the walls of a container, which comprises confining a predetermined amount of a granular material within a restricted space on a support, applying a predetermined pressure on the material in a direction to pack it in the restricted space, removing the pressure from the material, removing the support on which the material is positioned to determine whether any portion of the material is bridged across the restricted space, and repeating the above-outlined steps with incremental increases in the pressure applied to the material until a portion of the material is packed sufficiently to cause it to bridge across the space, whereby the packing point of the material is determined.

NORMAN ROBERTSON BUNNELL.

REFERENCES CITED

The following references are of record in the file of this patent:

UNITED STATES PATENTS

| Number | Name | Date |
| --- | --- | --- |
| 1,822,172 | Pfleumer et al. | Sept. 8, 1931 |
| 1,979,267 | Howe | Nov. 6, 1934 |
| 2,402,738 | Dietert | June 25, 1946 |
| 2,471,227 | Marshall | May 24, 1949 |